United States Patent [19]

Chelminski

[11] Patent Number: 4,472,794

[45] Date of Patent: Sep. 18, 1984

[54] SLEEVE SHUTTLE AIR GUN

[75] Inventor: Steven V. Chelminski, West Redding, Conn.

[73] Assignee: Bolt Technology Corporation, Norwalk, Conn.

[21] Appl. No.: 268,747

[22] Filed: Jun. 1, 1981

[51] Int. Cl.³ .................... G01V 1/02; G01V 1/104
[52] U.S. Cl. ............................ 367/144; 181/120; 181/119; 181/118; 367/142; 367/141
[58] Field of Search ............... 367/142, 144; 181/113, 181/117, 120

[56] References Cited

U.S. PATENT DOCUMENTS

| | | | |
|---|---|---|---|
| 3,249,177 | 5/1966 | Chelminski | 181/118 |
| 3,310,128 | 3/1967 | Chelminski | 181/119 |
| 3,379,273 | 4/1968 | Chelminski | 367/144 |
| 3,638,752 | 2/1972 | Wakefield | 181/120 |
| 3,653,460 | 4/1972 | Chelminski | 181/120 |
| 3,808,822 | 5/1974 | Chelminski | 181/119 |
| 3,997,021 | 12/1976 | Chelminski | 367/144 |
| 4,038,630 | 7/1977 | Chelminski | 367/23 |
| 4,051,918 | 10/1977 | Rogers | 181/119 |
| 4,114,723 | 9/1978 | Paitson et al. | 181/120 |
| 4,180,139 | 12/1979 | Walker | 181/120 |
| 4,210,222 | 7/1980 | Chelminski et al. | 181/107 |
| 4,234,052 | 11/1980 | Chelminski | 181/120 |
| 4,240,518 | 12/1980 | Chelminski | 181/107 |
| 4,271,924 | 6/1981 | Chelminski | 181/120 |

Primary Examiner—Nelson Moskowitz
Assistant Examiner—Ian Lobo
Attorney, Agent, or Firm—Parmelee, Bollinger & Bramblett

[57] ABSTRACT

A sleeve shuttle air gun is described which can be fired by a solenoid valve without dumping compressed air into the ambient prior to firing, thereby avoiding the generation of premature impulses caused by such dumping and avoiding the heavy duty complex solenoid dump valves and two-stage dump valves of the prior art. The sleeve shuttle is automatically returned to its initial closed and sealed position after each firing of the airgun by the refilling flow of only one level of pressurized air without a separate low level pressure source to control the sleeve shuttle. A long acceleration path is provided so the sleeve shuttle attains velocity prior to opening the discharge ports for producing a sudden, powerful discharge. The end of the sleeve shuttle travels completely beyond the discharge ports, and is then damped by interaction with damper ports located beyond the discharge ports. The trigger chamber for initiating firing is defined by an inner annular lip at one end of the sleeve shuttle engaging the firing seal in the initial closed position and by an outer annular shoulder on the outside of the shuttle engaging an encircling seal. A replaceable stationary piston ring in sliding engagement with the inner wall of the sleeve shuttle and a replaceable stationary cylinder sleeve in sliding engagement with said annular shoulder accommodate wear. The volume of the firing chamber is changed by replacing a chamber on the opposite end of the air gun from the solenoid valve.

26 Claims, 4 Drawing Figures

SLEEVE SHUTTLE AIR GUN

BACKGROUND OF THE INVENTION

This invention relates to a high pressure air gun for generating powerful impulses, and more particularly to a novel air gun which employs a sleeve-type shuttle.

Air guns for producing powerful impulses have many advantages which result from the fact that the powerful impulse is readily repeatable as desired. Such powerful impulses are useful for many purposes, for example, in seismic exploration the air guns are used to generate seismic impulses transmitted into the medium in which they are positioned, such as in water or in a land seismic source, which contains water and is coupled to the earth.

In seismic surveying in a medium, such as water, seismic wave energy is generated by air guns submerged in the water and is utilized to investigate subsurface geological conditions and formations. For this purpose, one or more of such air guns are submerged in the water, and compressed air, or other gas or gases under pressure, is fed to the submerged guns and temporarily stored therein. At the desired instant, the seismic source air guns are actuated, i.e., fired by means of an electrically operated trigger valve, i.e. a solenoid valve, and the pressurized gas is abruptly released into the surrounding water. In this manner, powerful seismic waves are generated capable of penetrating deeply into subsurface material to be reflected and refracted therein by the various strata and formations. The reflected or refracted waves are sensed and recorded to provide information and data about the geological conditions and formations.

It is also possible to submerge such seismic sources in marsh land, swamp or mud areas which are infused with sufficient water that the seismic surveying apparatus described herein can be used. Accordingly, the term "water" as used herein is intended to include marsh land, swamp or mud which contains sufficient water to enable such apparatus to be used.

For further background on such apparatus, reference may be made to U.S. Pat. Nos. 3,249,177; 3,379,273; 3,653,460; 3,808,822; 3,997,021; 4,038,630; and 4,234,052 assigned to the same assignee as the present application.

For further background in air guns used in land seismic sources, reference may be made to U.S. Pat. Nos. 3,310,128; 3,779,335; 3,800,907; and 4,108,271 assigned to the same assignee as the present application.

For further background on solenoid valves for triggering the firing of airguns and for monitoring the instant of firing reference may be made to U.S. Pat. Nos. 3,588,039; 4,210,222; and 4,240,518 assigned to the same assignee as the present application.

In the prior art, a sleeve-type shuttle air gun, such as shown and described in U.S. Pat. No. 3,638,752 to Wakefield entitled "Seismic Signal Generator", includes two high pressure chambers, a control chamber and a firing (or main) chamber. The firing chamber is provided with exhaust ports which in the unfired position are sealed by a movable sleeve shuttle. The sleeve shuttle has an upper (or control) face which is exposed to pressurized air in the control chamber and has a greater exposed area than the lower (or firing) face of the sleeve shuttle which is exposed to the pressurized air in the firing chamber when the sleeve shuttle is in its closed position. When the pressure of the air in both chambers is equalized, the differential in the forces being exerted on the exposed opposite ends of the sleeve shuttle holds the sleeve shuttle in closed or blocking position over the exhaust ports. A solenoid valve is provided for firing the sleeve type air gun by dropping the pressure in the control chamber by dumping the high pressure air contained therein, thereby upsetting the differential in the forces on the two opposing ends of the sleeve shuttle. Thus, the shuttle is moved for opening the exhaust ports to allow the pressurized air in the firing chamber to escape.

This dumping of pressurized gas in order to trigger the firing of an air gun is undesirable because it may create spurious signals in the water when the air gun is being used for marine seismology and also because of the flow limitations and difficulties associated with dumping or venting techniques for high pressure air.

U.S. Pat. No. 4,051,918 to Rogers, entitled "Seismic Energy Source" illustrates a tandem sleeve shuttle air gun arrangement operating on similar principles; namely, the venting of high pressure air is required for firing the first chamber of this tandem air gun. The reduction in pressure in the first chamber in turn causes the second chamber to fire.

With respect to sleeve shuttle type air guns, U.S. Pat. No. 4,114,723 to Paitson entitled "Pneumatic Seismic Signal Generator With Independent Firing Control Pressure" recognizes that there is an advantage in using a single air supply for both the control and firing chambers but states that there are many disadvantages aside from the mechanical complexity of the gun. Since very high air pressures are involved, this Paitson patent states that the solenoid dump valve must be specially built and the solenoid valve seat must be very small in order to reduce the mechanical force acting against the solenoid valve stem. Also, it states that the pressure equalization lines between control and firing chambers are necessarily quite restricted. It states that in one commercial embodiment in present use, the control-air dump valve is a complex two-stage device in which an electrically operated solenoid valve upsets the forces on a differential-area air-actuated pilot valve. The pilot valve in turn upsets the differential forces across the main exhaust valve to trigger the air gun. It states that use of a pilot valve is necessary to reduce the forces acting against the stem of the solenoid valve. It admits that the additional valving of course contributes to increased gun maintenance.

In view of these difficulties, the Paitson patent discloses a seismic signal generator including the complicating expedient of two different pressure levels of compressed air: a high pressure source of about 3,000 to 5,000 pounds per square inch (p.s.i.) is used for filling the firing chamber and a control pressure source of 200 to 1,500 p.s.i. is used for the control chamber. Air is admitted to the control chamber at such relatively low pressure and holds the sleeve shuttle in the closed position, because of differential in the forces acting on the respective exposed end faces of the sleeve, resulting from a valve seat which covers an outer portion of the area of the firing end face, leaving only an inner portion exposed to the firing chamber. The firing chamber is pressurized to a high pressure by the separate high pressure supply, and there is no communication or equalization between the return and the firing chambers. Besides the complexity of requiring two separate supplies of pressurized air at different pressure levels to be connected to the air gun, this prior art sleeve shuttle air gun also has the disadvantage that it requires that air in the control chamber must be dumped into the ambient in order to upset the differential forces to move the sleeve shuttle away from the exhaust ports to release the pressurized air from the firing chamber. There is the further disadvantage in such prior art apparatus that the control air is dumped to ambient through at least one duct that includes a metering orifice to meter the volume of air released from the control chamber within a known time interval. Such a metering orifice inherently slows the dumping of control air and may be subject to clogging.

In another prior art air gun described in U.S. Pat. No 4,180,139 to Walker, entitled "Fluid Operated Seismic Generator", a hollow cylindrical actuator is mounted inside of the housing and is hydraulically or pneumatically driven within the housing in longitudinal strokes first in one direction and then in the other. This actuator has apertures which move past exhaust ports during each stroke. There are movable sealing pads or movable O-ring seals associated with these apertures which slide past the exhaust ports in the housing during each stroke, and consequently these moving sealing devices are subjected to severe stress and buffeting during each firing, leading to maintenance problems. The size of the exhaust ports themselves is inherently limited in order to minimize the wear and tear on the moving sealing devices each time they slide past the exhaust ports during a firing, with pressurized gas rushing past them. This prior art gun has the complicating aspects that the pressurized actuating air (or other fluid) which drives the cylindrical actuator back and forth must be dumped from a chamber at one end of the air gun while pressurized air is simultaneously being introduced into a chamber at the other end of the air gun, and vice versa, during the next stroke of the actuator. Thus, once again it is seen that a dumping operation is required in order to fire such a prior art air gun. The speed of the actuator assembly is limited by the need to dump air from in front of it, and thus the rapidity of opening the exhaust ports is limited. Furthermore, the actuating air is described as being at a lower pressure, supplied through a pressure regulating valve, than the firing-air pressure, and consequently this prior art air gun suffers the disadvantages and piping or hoseline and valving complexities resulting from the need for two different levels of pressurized air for operation.

SUMMARY

Accordingly, it is an object of the present invention to provide a new and novel sleeve shuttle air gun requiring only one pressure level for its operation for abruptly releasing a charge of pressurized gas for generating powerful impulses.

A further object of the present invention is to provide a sleeve shuttle air gun which does not dump pressurized gas into the ambient in order to trigger the firing of the air gun.

Among the advantages of this invention are those resulting from the fact that it provides a new and improved sleeve shuttle air gun which does not require a plurality of different pressure levels of pressurized gas nor a complex valving structure in order to fire the gun. Moreover, advantageously, the sudden increase in pressure occurring in the end of the return chamber toward which the sleeve shuttle moves during firing may be used for monitoring the instant of firing of this air gun. The sleeve shuttle is automatically returned by the refilling flow of pressurized gas to its initial closed and sealed position after each firing of the air gun.

Another advantage is that relatively large area discharge ports may be provided, and the sleeve shuttle is accelerated to a high velocity before suddenly opening these large area ports. Therefore, the charge of pressurized gas is allowed to burst forth through these discharge ports with explosive-like abruptness. In other words, this novel sleeve shuttle air gun offers low internal impedance to the sudden outburst of the pressurized gas.

A further advantage of this novel sleeve shuttle air gun is that all of the sealing elements are stationary; none slide past ports.

In carrying out this invention in one illustrative embodiment thereof, a sleeve shuttle air gun is provided having a housing defining a return chamber and a firing chamber with at least one discharge port. A sleeve shuttle having upper and lower end surfaces is movable within the housing and separates the firing and return chambers as well as releasably closing the discharge port(s). The upper end surface of the sleeve shuttle is exposed to the return chamber. A single source of pressurized gas is fed into the return chamber and from there into the firing chamber for causing the sleeve shuttle automatically to close the exhaust port and for charging the firing chamber with the pressurized gas. A solenoid valve applies the high pressure gas to the firing end surface of the sleeve shuttle for causing the sleeve shuttle to move at high velocity before suddenly opening the discharge port(s) for abruptly discharging the pressurized gas from the firing chamber to generate a powerful impulse.

A relatively long acceleration distance is provided so that the sleeve shuttle attains a high velocity prior to opening the discharge ports for producing a sudden, powerful discharge. The end of the sleeve shuttle advantageously travels completely beyond the discharge ports, and thereafter the shuttle motion is damped by interaction with damper ports located beyond the main discharge ports. The trigger chamber for initiating firing is defined by an inner annular lip at one end of the sleeve shuttle engaging the firing seal in the initial closed position and by an outer annular flange on the outside of the shuttle engaging with an encircling seal. A stationary piston ring in sliding engagement with the inner wall surface of the sleeve shuttle is replaceable for accommodating wear. A replaceable stationary cylinder liner is slidingly engaged by the annular flange on the outside of the shuttle sleeve for accommodating wear. The volume of the firing chamber is conveniently changed by removing and replacing a chamber member on the opposite end of the air gun from the solenoid valve. The instant of firing is advantageously monitored from the sudden increase in pressure occurring at the end of the return chamber toward which the sleeve shuttle moves when this air gun is fired.

BRIEF DESCRIPTION OF THE DRAWINGS

The invention, together with further objects, aspects, features and advantages thereof, will be more clearly understood from a consideration of the following description in connection with the accompanying drawings which show the best mode which I now contemplate for carrying out this invention.

DESCRIPTION OF THE PREFERRED EMBODIMENT

The sleeve shuttle apparatus 10 as described for generating powerful impulses is commonly referred to as an air gun because it usually is operated with compressed air. As used herein the term "high pressure gas" or "pressurized gas" is used in a broad sense intended to include any suitable compressible gaseous fluid which may be utilized in such an air gun and, it includes for example, (but is not limited to) compressed or pressurized air, steam, nitrogen, carbon dioxide, gaseous products of combustion, and mixtures thereof, and so forth. As stated, compressed air is most commonly employed because it is the most convenient and readily available compressible gaseous fluid. However, in the event that conditions or other reasons dictate against the use of compressed air or in favor of another fluid, then another suitable compressible gaseous fluid, such as those described, may be utilized.

Figure 1:
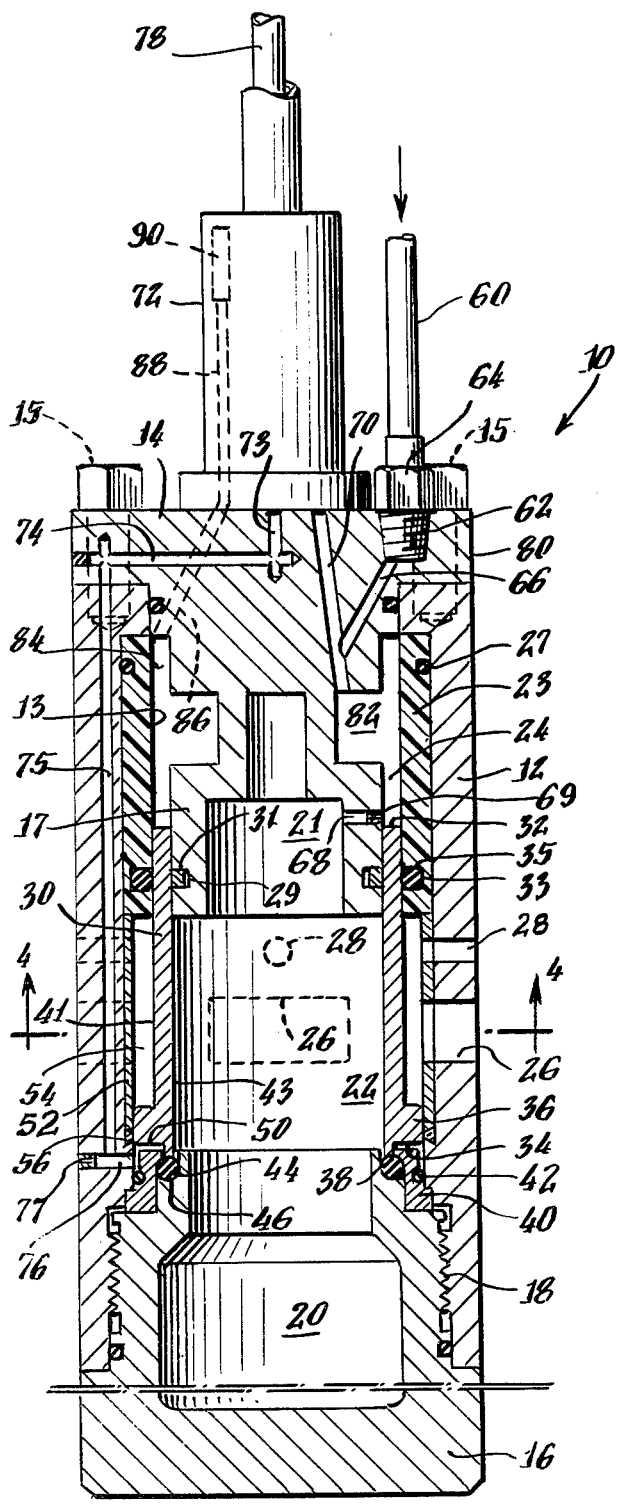
FIG. 1 is an elevational view, primarily in section, illustrating the air gun with the sleeve shuttle in its initial closed and sealed position.
Figure 3:
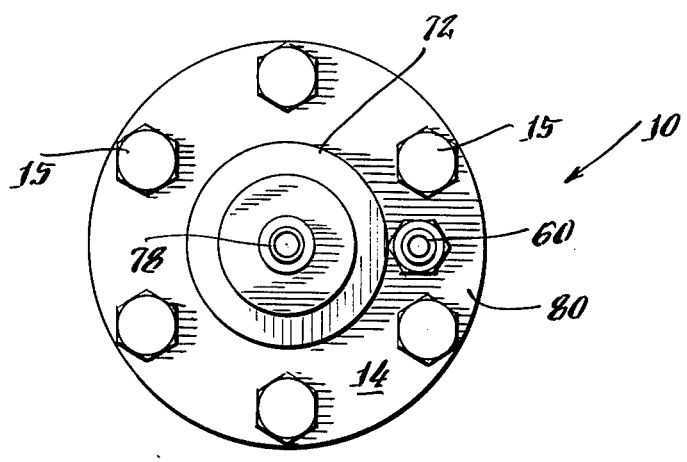
FIG. 3 is a top view of the air gun of FIGS. 1 and 2.

Referring now to FIG. 1 the air gun, generally indicated by the reference number 10, has an elongated cylindrical housing or casing 12 which is closed at the upper end by an upper end member 14 secured to the casing 12 by a circle of machine screws 15 (as best seen in FIG. 3). The lower end of the housing or casing 12 is closed by a removable and replaceable container 16 which is threaded at 18 and adapted to be screwed into the threaded lower end of the housing 12. The housing 12 has a firing chamber 22 for storing a charge of high pressure gas in the air gun 10 prior to the firing. The removable container 16 has a chamber 20 therein which communicates with and forms part of the whole firing chamber 22. Thus, by providing the threaded connection 18, containers 16 with different sizes of chambers 20 therein can be readily changed for providing different over-all firing chamber volumes 22.

In addition to the firing chamber 22, the air gun includes return chamber 24. This upper return chamber 24 is defined by the downwardly extending portion 17 of the upper end member 14 and by the inner cylindrical side wall surface 13 of a liner 23 within the casing 12, with the return chamber being located directly above the outer portion of the firing chamber 22.

The downwardly extending portion 17 of the upper end member 14 is hollowed out at 21 for providing an upper chamber 21 which communicates with and forms part of the whole firing chamber 22. It is to be understood that the structure of this air gun 10 is arranged advantageously so that the volume of this upper chamber 21 can readily be enlarged if desired to become approximately equal to the volume of any given lower chamber 20 by enlarging the axial length of the hollow portion 17 and by correspondingly enlarging the axial length of the upper portion of the cylindrical casing 12. Thus, the over-all volume of the whole firing chamber 22, including regions 21 and 20, may be approximately equally distributed, if desired, above and below the discharge ports 26 for providing the shortest overall average path length for the pressurized gas in discharging from the firing chamber through the suddenly opened ports 26 for providing a low internal impedance to the sudden outburst of the pressurized gas.

There are a plurality of such discharge ports 26 extending through the housing 12 and communicating with the firing chamber 22. A plurality of damper ports 28 also extend through the housing 12 in a location above the discharge ports 26. These damper ports 28 also communicate with the firing chamber, and their function will be described later.

Figure 2:
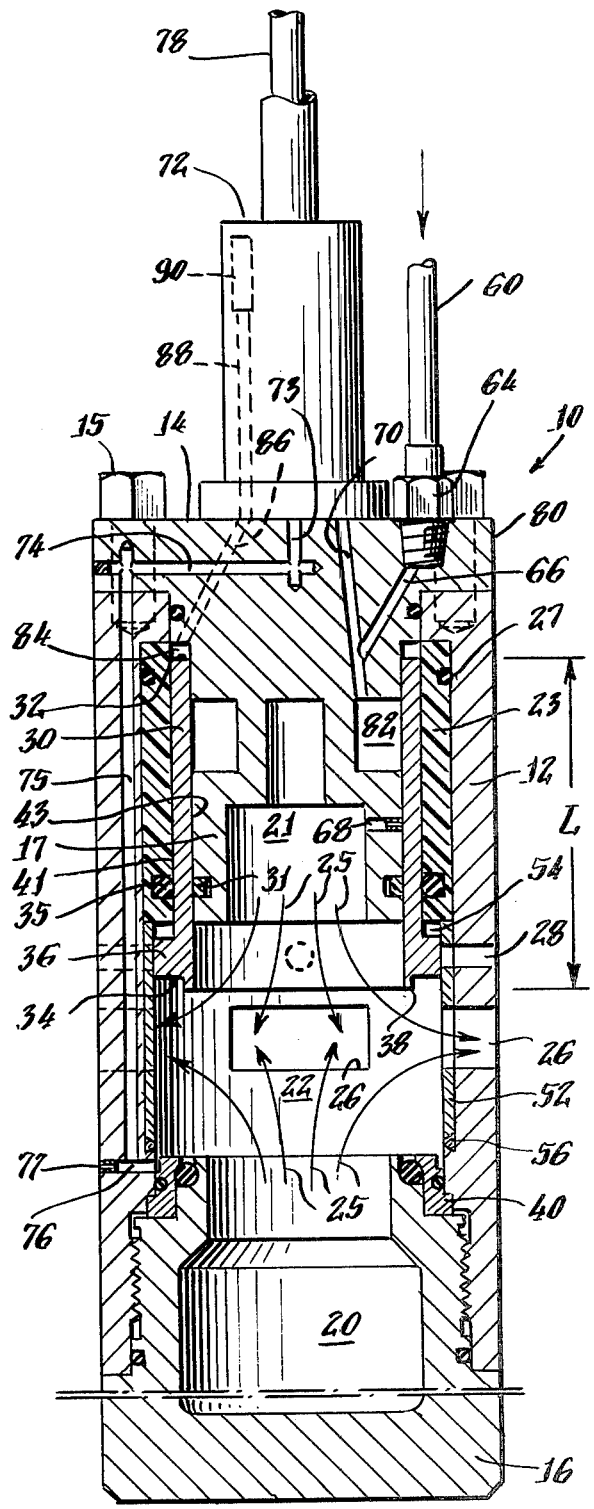
FIG. 2 is a view similar to FIG. 1 illustrating the relative position of the sleeve shuttle after it has moved at high velocity to the limits of its travel in the air gun upon firing of the air gun.
Figure 4:
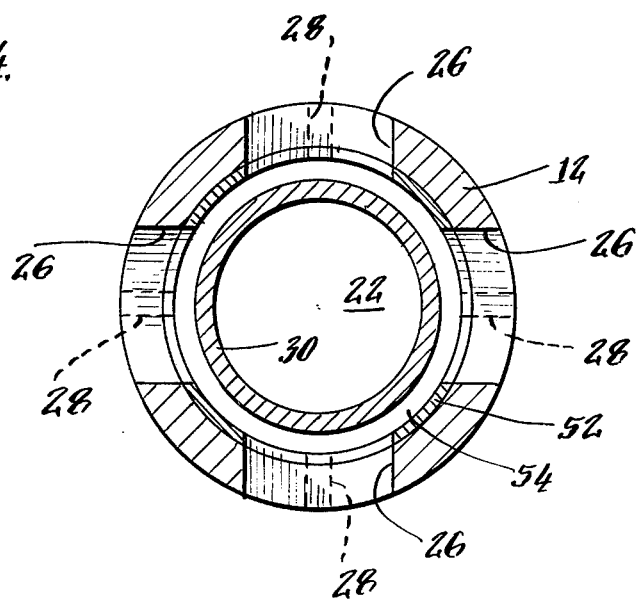
FIG. 4 is a cross-sectional view taken along line 4—4 of FIG. 1, looking upwardly.

FIGS. 1, 2 and 4 illustrate the relative positioning of the discharge and damper ports 26 and 28, respectively, through the casing 12 in the presently preferred embodiment. As shown the damper ports 28 are considerably smaller than the discharge ports 26 and are positioned above and in axial alignment with the center of each respective discharge port. It is to be understood that different discharge port arrangements may be provided, in which at least one discharge port is provided for the discharge of pressurized gas therethrough. The arrangement and number of discharge and damper ports utilized will depend on the particular application in which the air gun is employed. For example, as shown and claimed in U.S. Pat. No. 4,038,631 of Vincent J. Murphy a single discharge port may be employed to advantage in a down hole type of air gun for selectively generating and directionally transmitting shear seismic waves in the earth. It is advantageous to incorporate a plurality of discharge ports symmetrically arranged around the circumference of the cylindrical housing for a marine seismic air gun. Four discharge ports 26 and four damper ports 28 are incorporated in this air gun 10 as shown. The discharge ports have a relatively large area rectangular configuration as seen in elevational view, with their axial length being considerably less than their circumferential extent. In this example the circumferential length of the discharge ports 26 is at least 1.5 times their axial length for providing a very sudden opening of these large area ports. Therefore, there is relatively low internal impedance experienced by the sudden discharge of the pressurized gas as shown by the flow arrows 25 in FIG. 2 through these relatively large ports 26. The four damper ports 28 are smaller round ports, for reasons as will be explained.

A sleeve shuttle 30 is movably mounted within the housing 12 and separates the firing and return chambers 22 and 24, respectively. This sleeve shuttle 30 is formed of relatively thin, strong material, for example of stainless steel so as to be strong but also relatively light in weight for rapid acceleration to high velocity. It performs the function of releasably closing the discharge ports 26 of the firing chamber. This sleeve shuttle 30 has an upper end surface 32 (which may be called the return surface) in communication with the return chamber 24. The sleeve shuttle is slideably movable in the return chamber with the assistance of an inner fixed piston ring 31 mounted in a recess 29 in the cylindrical side surface of the downwardly extending portion 17 of the upper end member 14.

The cylindrical liner sleeve 23 forms part of the housing means and is removable and replaceable within the casing 12. This liner may be made of suitable slippery bearing material, for example, of bronze or strong plastic, for example Delrin. It is sealed to the housing 12 by an O-ring 27 seated in a peripheral groove in the liner. This cylinder liner 23 guides the sleeve shuttle 30 and has a close tolerance but freely movable sliding fit therewith.

In order to seal the outer cylindrical surface 41 of the sleeve shuttle 30 there is an O-ring 35 positioned in a groove 33 in the inner wall surface of the liner 23 in sliding sealing engagement with this outer surface 41.

There is a slight clearance between the inner cylindrical surface 43 of the sleeve shuttle 30 and the portion 17 of the housing end member 14, with the piston ring 31 being in sliding engagement with this inner surface 43.

The sleeve shuttle 30 has an outer annular flange 36 thereon with a downwardly extending lip 38 extending therefrom at the lower end of the sleeve shuttle 30. This annular lip 38 is flush with the inner cylindrical surface 43 of the sleeve shuttle, and thus there is essentially no area of the lower end of the sleeve shuttle exposed to the firing chamber when the shuttle is in its initial position. The trigger surface 34 of the sleeve shuttle is provided by the lower surface of the annular flange 36 located radially outside of the lip 38, and this lip engages a firing seal 44 of tough resilient material, for example of polyurethane, when in its initial closed position.

A retainer 40 in sealing engagement with the casing 12 by means of an O-ring seal 42 is mounted below and spaced from the trigger surface 34 of the shuttle 30 forming a small trigger chamber 50 therebetween. The firing seal 44 is held by the retainer 40 in an annular recess 46 in the container 16 and is adapted when the air gun is ready to be charged with pressurized gas to be in sealing engagement with the lip 38 of the sleeve shuttle 30.

A cylindrical liner sleeve 52 is positioned in the casing 12 surrounding the firing chamber 22 and is in sealing engagement with the annular flange 36 via an encircling seal 56 when the sleeve shuttle 30 is in its initial unfired position in the firing chamber 22. This liner 52 is a removable and replaceable portion of the housing. It is made of suitable slippery bearing materials for example of bronze or strong plasic, for example Delrin. The seal 56 is trapezoidal in cross-sectional configuration so that it is captured between the bevelled lower end of the liner 52 and a cooperating bevelled surface of the casing 12 immediately below the seal 56.

For dynamic stability, i.e. to minimize tendency to cocking, it is my preference that the sleeve shuttle 30 have an axial length "L" greater than the outside diameter (O.D.) of its outer cylindrical surface 41. The annular flange 36 is located adjacent to the trigger surface 34 at the lower end (or firing end) of the sleeve shuttle. This annular flange 36 has a relatively small axial length compared to the axial length L of the sleeve shuttle in order to minimize the overall mass of this sleeve shuttle so that it will rapdily accelerate to high velocity prior to discharge. For example as shown its axial length is less than 15% of L. Its axial length is intended to be sufficient to provide adequate strength and to provide an adequate bearing area against the liner 52.

For advantageously damping the high velocity motion of the sleeve shuttle 30 as it nears the end of its travel, the liner 52 defines a variable volume damper chamber 54 with the outer cylindrical surface 41 of the sleeve shuttle above the annular flange 36. The variable chamber 54 is in communication with and filled with the ambient medium, usually water, through which the powerful impulses generated by the air gun 10 are to be transmitted. Accordingly, if the air gun 10 is submerged in water, the water enters and fills the variable chamber 54 through the ports 26 and 28.

In order to fill the firing chamber 22 and the return chamber 24 with pressurized gas, a source of pressurized gas, such as compressed air for example above 2,000 p.s.i., is fed through a high pressure supply hose line 60 to a high pressure supply inlet 62 in the upper end member 14 and secured therein by a fitting 64. A filler supply passage 66 conducts the pressurized gas into a side region 82 of the return chamber 24 communicating with the upper end surface 32 of the sleeve shuttle 30, thereby forcing this shuttle 30 downwardly through the firing chamber until the lip 38 is in sealing engagement with the firing seal 44. A small fill passage 68 communicating with the return chamber 24 and upper region 21 of the firing chamber 22 conducts the pressurized gas from the return chamber 24 into the firing chamber 22. Pressurized gas is thus supplied until the firing chamber 22 (including regions 21 and 20) is charged the desired pressure level prior to firing. A removable orifice element 69 is screwed into a socket at the outer end of the fill passage 68 for assuring that the pressure in the return chamber 24 is sufficiently high for firmly seating the lip 38 against the firing seal 44 before the firing chamber begins to re-charge after firing.

The upper end member 14 includes an enlarged diameter top portion or flange 80 which seats down against the end of the casing 12, with the machine screws 15 passing through holes in this top portion 80. This member 14 also includes an annular recess 82 forming a side chamber enlargement of the return chamber 24.

When the sleeve shuttle 30 moves upwardly at high velocity, air in the return chamber 24 is displaced by the end surface 32 into this side chamber 82 for minimizing the opposition of the air in the return chamber to the sudden, high velocity upward travel of the sleeve shuttle. Above the level of this side chamber 82, the return chamber 24 resumes its original size, thereby advantageously forming an upper air-trapping region 84. This air-trapping region 84 is shown with an axial length which is at least equal to twice the radial thickness of the end 32 of the sleeve shuttle for assuring that an advantageous, significant and sudden increase in pressure occurs therein when the shuttle end 32 suddenly enters as shown in FIG. 2. A passage 86 in the end member 14 communicates with this air-trapping region 84 and with a passage 88 in a solenoid valve 72 leading to a pressure transducer 90 mounted in a recess in the housing of this solenoid valve. The sudden increase in pressure occurring in the region 84 caused by entry of the end surface 32 of the sleeve shuttle upon firing is sensed by the transducer 90 for providing an electrical signal desireably and usefully indicating the instant of firing of the air gun.

It is to be noted that the damper ports 28 are spaced beyond the discharge ports 26 by a distance no less than the axial length of said annular shoulder 36. Thus, the damper ports do not commence to be constricted until the annular shoulder has passed completely beyond the discharge ports for fully opening the discharge ports before occurrence of constrictive damping of the sleeve shuttle movement.

In order to trigger the firing of the air gun 10, a trigger passage 70 is provided in the upper end member 14 which extends from the side chamber 82 into the solenoid valve 72 and trigger passages 73, 74, 75, 76 extend from the solenoid valve down through the end member 14 and through housing 12 to the small chamber 50 which communicates with the lower end trigger surface 34 of the sleeve shuttle 30. When the solenoid valve 72 is actuated by an electrical signal through the waterproof electrical cable 78 pressurized gas flows through these passages 70, 73, 74, 75, 76 into the small chamber 50 under the lower end surface 34 of the shuttle 30 for suddenly forcing the shuttle upwardly, suddenly separating the lip 38 on the sleeve shuttle 30 from the firing seal 44 and driving the sleeve shuttle 30 upwardly at high velocity, thereby abruptly discharging pressurized gas through the ports 26 as shown in FIG. 2 by the arrows 25.

It is to be appreciated that the area of the trigger surface 34 of the shuttle 30 formed by the underside of the annular flange 36 radially outward beyond the lip 38 is larger than the area of the upper end surface 32. This differential in area produces a trigger unbalance which causes the acceleration of the sleeve shuttle through the firing chamber. As soon as the sleeve shuttle begins moving, its entire lower end surface, including trigger surface 34 plus the projected area of the lip 38, is exposed to the pressurized gas in the firing chamber for producing a very powerful opening force for producing high acceleration leading to high velocity of the sleeve shuttle 30 before the discharge ports 26 are opened. Consequently, these ports 26 are opened with explosive-like abruptness for producing a very powerful impulse. By providing a trigger passage 76 which communicates with the annular trigger chamber 50, there is no problem during assembly in aligning this trigger passage with the trigger chamber 50 since this trigger chamber extends all of the way around the air gun. Moreover, this trigger passage 76 communicates with the firing chamber 22, as seen in FIG. 2, after firing. Thus, the pressure in passages 76, 75, 74, 73 drops upon firing for allowing the shuttle to re-seal itself in closed position. In other words, the pressure in the trigger chamber 50 is low and does not oppose the re-sealing of the lip 38 with the firing seal 44.

In order to prevent any minute leakage from inadvertently prematurely building up pressure in the trigger chamber 50 there is a tiny bleed orifice to ambient provided in a plug element 77 communicating with the trigger passage 76.

When the air gun 10 is fired, the outer flange 36 of the sleeve shuttle 30 moves to reduce the volume of the variable chamber 54, forcing the transmission medium out of the discharge ports 26 and out through the damper ports 28. Since these damper ports have been provided, the sleeve shuttle 30 can be moved completely past the discharge ports 26, which fully opens these ports and enhances the ability of the air gun 10 to generate a powerful impulse. This full-open action is illustrated in FIG. 2 in which the discharge ports 26 are completely open with the arrows 25 indicating the explosive discharge of the pressurized gas from the firing chamber 22.

As the sleeve shuttle approaches its fully elevated position, as shown in FIG. 2, the flange 36 has passed the discharge ports 26, which are now completely open, and progressively closes the damper ports 28, thereby constricting the variable chamber 54 for damping the shuttle motion by progressively restricting the flow of the medium, e.g, water, out through these damper ports.

The transducer 90 senses the abrupt increase in pressure occurring in the air-trapping chamber 84 and produces an electrical signal indicating the instant of actual firing of the air gun.

After firing, as pressurized gas is fed through the hose line 60, it is applied to the upper surface 32 of the sleeve shuttle 30 moving the shuttle back into sealing engagement with the firing seal 44 and readying the air gun to again be charged. Accordingly, in filling for the next "shot" the shuttle 30 automatically returns to its initial closed and sealed position. The air gun is automatically conditioned for repeated firing without requiring additional pressure sources or additional hose lines or other structures.

The many advantages of this novel sleeve shuttle air gun were discussed at various points in the foregoing specification and will not be summarized here.

For convenience of description the terms "upper" or "top" and "lower" or "bottom", or similar positional phrases were used, but it is to be understood that the air gun 10 can be operated in any orientation as may be desired by the user for a particular application. Accordingly, the claim language is to be interpreted to cover an air gun embodying this invention, regardless of the particular orientation in which it happens to be used.

Since modifications and changes varied to fit particular operating requirements and environments will occur to those skilled in the art, the invention is not considered limited to the examples chosen for purposes of illustration and includes all changes or modifications and equivalents which do not constitute a departure from the true spirit and scope of this invention as set forth in the appended claims.

What is claimed is:

1. A sleeve shuttle air gun for abruptly and powerfully releasing a charge of pressurized gas thereby generating an abrupt, powerful impulse comprising:

housing means having a firing chamber and a return chamber therein, said firing chamber initially holding said charge of pressurized gas therein, said housing means including at least one discharge port extending from the firing chamber to the outside of said housing means, a cylindrical sleeve shuttle having upper and lower ends, said sleeve shuttle being movable within said housing means and separating said firing and return chambers, said sleeve shuttle closing said discharge port(s) when in its initial position, said upper end of said sleeve shuttle being within said return chamber, said lower end of said sleeve shuttle being within said firing chamber, means for supplying pressurized gas to said return and firing chambers for causing said sleeve shuttle to move to its initial position for closing said discharge port(s) and for charging said firing chamber with pressurized gas, and a firing seal within said housing means engaged by the sleeve shuttle in its initial position in a region adjacent to the inner cylindrical surface of said sleeve shuttle for separating the lower end surface of the sleeve shuttle from the firing chamber, said housing means defining a trigger chamber communicating with the lower end surface of the sleeve shuttle in its initial position, said housing means including a trigger passage communicating with said trigger chamber, and controllable valve means for suddenly feeding pressurized gas into said trigger chamber for forcing said sleeve shuttle away from said firing seal for exposing the lower end surface of said sleeve shuttle to the pressurized gas in said firing chamber for accelerating said sleeve shuttle to travel for opening said discharge ports for abruptly and powerfully releasing said charge of pressurized gas from the firing chamber through said discharge port(s).

2. A sleeve shuttle air gun as claimed in claim 1, in which:
said region engaged by said firing seal when said sleeve shuttle is in its initial position is a narrow portion of the lower end surface of the sleeve shuttle immediately adjacent to said inner cylindrical surface of the sleeve shuttle.

3. A sleeve shuttle air gun as claimed in claim 2, in which:
said region engaged by said firing seal when said sleeve shuttle is in its initial position is defined by an annular lip projecting axially at the lower end of said sleeve shuttle and being flush with the inner cylindrical surface of the sleeve shuttle.

4. A sleeve shuttle air gun as claimed in claim 1, in which:
said trigger passage connects said return chamber with said trigger chamber through said controllable valve means
air gun as claimed in claim 4, 5. A sleeve shuttle air gun as claimed in claim 4, in which:
said housing means includes a side chamber communicating with said return chamber below the upper end of said return chamber for allowing the advancing upper end of said sleeve shuttle to displace gas into said side chamber for reducing opposition to the sudden high velocity opening movement of said sleeve shuttle.

6. A sleeve shuttle air gun as claimed in claim 5, in which:
the upper end of said return chamber has a radial width closely matching the radial thickness of the upper end portion of the sleeve shuttle for providing a gas-trapping chamber positioned immediately in front of the advancing sleeve shuttle as the sleeve shuttle approaches the end of its firing stroke for generating a sudden increase in pressure in said gas-trapping chamber,
said trigger passage connects with said side chamber, and
transducer means communicating with said gas-trapping chamber for generating an electrical signal upon the occurrence of said sudden increase in pressure for indicating the instant of firing of the air gun.

7. A sleeve shuttle air gun as claimed in claim 1, 2, 3, 4, 5, or 6, in which:
said sleeve shuttle has an annular flange projecting outwardly near its lower end,
said housing means defines a damper chamber therein encircling said sleeve shuttle above said annular flange when said sleeve shuttle is in its initial position, and
said housing means includes means for admitting fluid medium into said damper chamber for damping the high velocity movement of said sleeve shuttle after said discharge ports have been suddenly opened by movement of the sleeve shuttle.

8. A sleeve shuttle air gun as claimed in claim 7, in which:

there are a plurality of discharge ports circumferentially spaced around said housing,
said damper chamber extends beyond said discharge ports in the direction of movement of said annular shoulder during firing of said air gun, and
said housing means has a plurality of damper ports extending from the damper chamber to the outside of said housing means, said damper ports being positioned beyond said discharge ports in the direction of movement of said sleeve shuttle during firing.

9. A sleeve shuttle air gun as claimed in claim 8, in which:
said damper ports are positioned beyond said discharge ports by a distance no less than the axial length of the periphery of said annular shoulder for causing said annular shoulder to begin restricting said damper ports only after said annular shoulder has fully passed said discharge ports, and
said discharge ports have a relatively large flow area with a circumferential length greater than their axial length for suddenly and fully releasing the pressurized gas from said firing chamber through said discharge ports with low internal impedance with respect to the sudden discharge flow of pressurized gas.

10. A sleeve shuttle air gun as claimed in claim 1, 2, 3, 4, 5 or 6, in which:
said sleeve shuttle has an annular flange projecting outwardly near its lower end,
said housing means defines a damper chamber therein encircling said sleeve shuttle above said annular flange when said sleeve shuttle is in its initial position,
a removable liner of bearing material included in said housing means, said liner encircling said damper chamber and being slidingly engaged by the perimeter of said annular flange,
said discharge port(s) extend through said liner, and
said housing means includes means for admitting fluid medium into said damper chamber for damping the high velocity movement of said sleeve shuttle after said discharge ports have been suddenly opened by movement of the sleeve shuttle.

11. A sleeve shuttle air gun as claimed in claim 10, in which:
said damper chamber extends beyond said discharge port(s) in the direction of movement of said annular flange during firing of said air gun, and
said housing means has at least one damper port extending from the damper chamber to the outside of said housing means, said damper port(s) extending through said removable liner.

12. A sleeve shuttle air gun as claimed in claim 11, in which:
said damper port(s) is (are) positioned beyond said discharge port(s) by a distance at least equal to the axial length of the perimeter of said annular flange for allowing said annular flange to move fully past said discharge port(s) before said annular shoulder begins restricting the flow of the fluid medium through said damper ports.

13. A sleeve shuttle air gun for abruptly and powerfully releasing a charge of pressurized gas thereby generating a powerful impulse comprising:
container means having a firing chamber and a return chamber therein, said firing chamber initially holding said charge of high pressure gas, discharge port means extending from said firing chamber to the exterior of said container means, a sleeve shuttle having upper and lower end surfaces and being movable within said container and separating said firing and control chambers, said sleeve shuttle releasably closing said discharge port means, said upper end surface of said sleeve shuttle being exposed to said return chamber, means for supplying pressurized gas to said return and firing chambers for causing said sleeve shuttle to close said discharge port means and for charging said firing chamber with pressurized gas, firing seal means engaged by a lower end portion of said sleeve shuttle in its initial position for isolating the lower end surface of said sleeve shuttle from the firing chamber, and firing means for applying pressurized gas to said lower end surface of said sleeve shuttle to force said sleeve shuttle to move in said firing chamber toward said return chamber for opening said discharge port means, thereby abruptly discharging the pressurized gas from said firing chamber for generating a powerful impulse.

14. The sleeve shuttle air gun as claimed in claim 13 in which:

said sleeve shuttle has an annular flange projecting outwardly near its lower end, with an annular lip extending downwardly from the lower end adjacent to the inner surface of said sleeve shuttle, and said annular lip engaging said firing seal means for isolating the lower end surface of the sleeve shuttle including the lower surface of said annular flange from the firing chamber.

15. The sheeve shuttle air gun as claimed in claim 14, in which:

said container means defines a damper chamber therein encircling said sleeve shuttle above said annular flange, said sleeve shuttle in its initial position separates said damper chamber from said firing chamber, said discharge port means communicate with said damper chamber, said damper chamber is reduced in volume by said annular flange on said sleeve shuttle when said sleeve shuttle is moving during firing, and said annular flange suddenly passes said discharge port means during firing for suddenly opening said dischrge port means to said firing chamber for suddenly discharging pressurized gas through said discharge port means.

16. The sleeve shuttle air gun as claimed in claim 14, in which:

a liner of bearing material in said container means surrounds said firing chamber, outer sealing means are associated with said liner, said annular flange is in sealing engagement with said outer sealing means when said sleeve shuttle is in its initial position, said sleeve shuttle and said liner define a damper chamber located therebetween above said annular flange when said sleeve shuttle is in its initial position, and said discharge port means extend through said liner and communicate with said damper chamber as defined by the sleeve shuttle in its initial position.

17. The sleeve shuttle air gun as claimed in claim 16, in which:

damper port means communicate with said damper chamber positioned above said discharge port means for permitting the continued expulsion of fluid medium from said damper chamber through said damper port means after said annular flange has passed said discharge port means during firing until said annular flange progressively blocks said damper port means, thereby damping further movement of said sleeve shuttle.

18. The sleeve shuttle air gun as claimed in claim 14, 15, 16 or 17, in which:

retainer means surround said firing seal means for holding said firing seal means, said retainer means and the lower end surface of said sleeve shuttle forming a small trigger chamber therebetween, and said firing means includes a solenoid valve and trigger passage for suddenly fedding pressurized gas into said trigger chamber when said solenoid valve is actuated thereby disengaging said lip from said firing seal means for propelling said sleeve shuttle upwardly for suddenly opening said discharge port means for abruptly discharging said pressurized gas from said firing chamber through said discharge port means.

19. The sleeve shuttle air gun as claimed in claim 13, 14, 15, 16 or 17, in which:

said container means includes a side chamber communicating with said return chamber below the upper end of said return chamber for allowing the advancing upper end of said sleeve shuttle to displace gas into said side chamber for reducing opposition to the sudden high velocity firing movement of said sleeve shuttle.

20. The sleeve shuttle air gun as claimed in claim 19, in which:

the upper end of said return chamber has a radial width closely matching the radial thickness of the upper end portion of the sleeve shuttle for providing a gas-trapping chamber positioned immediately in front of the advancing sleeve shuttle as the sleeve shuttle approaches the end of its firing stroke for generating a sudden increase in pressure in said gas-trapping chamber, said trigger passage connects with said side chamber, and transducer means communicating with said gastrapping chamber for generating an electrical signal upon the occurrence of said sudden increase in pressure for indicating the instant of firing of the air gun.

21. The sleeve shuttle air gun as claimed in claim 13, 14, 15 16 or 17, in which:

said discharge port means comprises a plurality of discharge porst circumferentially spaced around the container means, and each of said discharge ports has a relatively large flow area rectangular configuration and has a circumferential length greater than its axial length for providing sudden discharge of the pressurized gas with low impedance from the firing chamber by the lower end of said sleeve shuttle suddenly moving completely past said discharge ports for suddenly fully opening them.

22. A sleeve shuttle air gun for abruptly and powerfully releasing a charge of high pressure gas into a transmission medium thereby generating a powerful impulse in said medium comprising:
- an elongated cylindrical casing closed at the upper end thereof by an upper end member and having a return chamber therein,
- a firing chamber in said casing below said upper end member for initially holding said charge of high pressure gas therein,
- discharge port means in said casing communicating with said firing chamber,
- a movable sleeve shuttle having upper and lower end surfaces, said sleeve shuttle separating said firing and return chambers and releasably closing said discharge port means,
- a firing seal in sealing engagement with said lower end surface of said sleeve shuttle in its initial closed position, said upper end surface of said sleeve shuttle being in communication with said return chamber,
- means for supplying high pressure gas to said return and firing chambers for causing said sleeve shuttle to move to its initial closed position for closing said discharge port means and for charging said firing chamber with high pressure
- firing means for applying high pressure gas to the lower end surface of said sleeve shuttle for breaking the firing seal engagement with said lower end surface for propelling said sleeve shuttle upwardly in said firing chamber, thereby opening said discharge port means for abruptly discharging said charge of high pressure gas therethrough to generate a powerful impulse in said transmission medium.

23. The sleeve shuttle air gun as claimed in claim 22 in which:
- said sleeve shuttle has an outwardly projecting annular flange near its lower end,
- an annular lip extends downwardly from said lower end
- said lip and said flange define said lower end surface of said sleeve shuttle, and
- said lip is in sealing engagement with said firing seal when said firing chamber is being charged with said high pressure gas.

24. The sleeve shuttle air gun as claimed in claim 23 having:
- retainer means in said casing encircling said firing seal for holding said firing seal,
- said retainer means and said lip and flange on said sleeve shuttle forming a trigger chamber under said end surface of said sleeve shuttle when said shuttle is in its initial closed position, and high pressure gas is suddenly introduced into said trigger chamber for firing said air gun.

25. The sleeve shuttle air gun as claimed in claim 23 or 24 in which:
- said sleeve shuttle forms a variable chamber with said casing above said annular flange,
- said discharge port means communicates with said variable chamber, thereby filling said variable chamber with said medium, and
- damper port means positioned above said discharge port means in said casing communicating with said variable chamber for permitting said annular flange of said sleeve shuttle to move above and completely open said discharge port means and thereafter to damp further movement of said sleeve shuttle when said annular flange progressively closes said damper port means.

26. The sleeve shuttle air gun as claimed in claim 22, 23, 24 or 25, in which:
- a stationary piston ring encircles said upper end member in sliding engagement with the inner cylindrical surface of said sleeve shuttle for sealing said return chamber.

* * * * *